United States Patent
Chen

(10) Patent No.: US 9,419,425 B2
(45) Date of Patent: Aug. 16, 2016

(54) RETRACTABLE TERMINATION PEDESTAL

(71) Applicant: Verizon Patent and Licensing Inc., Arlington, VA (US)

(72) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 99 days.

(21) Appl. No.: 14/231,017

(22) Filed: Mar. 31, 2014

(65) Prior Publication Data
US 2015/0282353 A1  Oct. 1, 2015

(51) Int. Cl.
  *H02B 1/20* (2006.01)
  *H02G 9/10* (2006.01)
  *H02G 3/18* (2006.01)

(52) U.S. Cl.
  CPC . *H02G 9/10* (2013.01); *H02G 3/185* (2013.01)

(58) Field of Classification Search
  CPC .................................. H05K 5/04; H05K 7/14
  USPC ................. 174/827, 796, 797, 679.01, 727; 439/31, 260, 266, 492
  See application file for complete search history.

(56) References Cited

U.S. PATENT DOCUMENTS

| | | | | |
|---|---|---|---|---|
| 3,793,696 A | * | 2/1974 | Barr | B43M 99/009 29/809 |
| 3,992,654 A | * | 11/1976 | Springer | H01R 12/7005 361/679.01 |
| 4,173,400 A | * | 11/1979 | Faramarzpour | G03B 15/03 396/168 |
| 4,227,237 A | * | 10/1980 | Matthews | H05K 5/04 361/727 |
| 5,122,741 A | * | 6/1992 | Ohsumi | G01D 5/14 324/207.13 |
| 6,042,408 A | * | 3/2000 | Noro | H01R 12/79 439/260 |

* cited by examiner

*Primary Examiner* — Xiaoliang Chen

(57) ABSTRACT

An apparatus, method, and system are disclosed for housing and terminating various cables. The apparatus is mounted on a base, which allows it to be pivoted to different positions. The apparatus includes a portion capable of receiving a cable containing various types of wires. A patch panel is provided on a track assembly in order allow various operations such as termination of the wires. The apparatus can remain above ground, or positioned below ground when not being accessed.

12 Claims, 7 Drawing Sheets

RETRACTABLE TERMINATION PEDESTAL

BACKGROUND INFORMATION

In order to configure service to customers, utility companies are often required to access various infrastructure components. For example, such configuration can include activation, modification, or cancellation of customer services. Cables which contain multiple wires for transmitting data, voice, etc. are typically routed underground to neighborhoods for connection to individual households and/or service subscribers. The cables can be directed into a termination pedestal containing a connection panel which allows individual connections to be made to subscribers and/or households. Termination pedestals are typically in the form of a housing that can be up to several feet in height and positioned above ground level. Such termination pedestals are often subjected to vandalism or unauthorized access. Furthermore, they may be subject to environmental damage resulting from moisture or water.

Various localities have also enacted regulations which limit the size of termination pedestals, particularly in urban or environmentally sensitive areas. Some regulations further require positioning termination pedestals such that they are, or entirely, below ground level. It can be difficult, however, for a service technician to access and efficiently perform necessary operations when the termination pedestal is located partially, or entirely, below ground level. While complying with local regulations, such termination pedestals require an increased amount time to perform certain operations relative to those positioned above ground level.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and system for housing and terminating cables are described. In the following description, for the purposes of explanation, numerous specific details are set forth in order to provide a thorough understanding of the described embodiments. It is apparent, however, to one skilled in the art that various embodiments may be practiced without these specific details or with an equivalent arrangement. In other instances, well-known structures and devices are shown in block diagram form in order to avoid unnecessarily obscuring the described embodiments.

Figure 1:
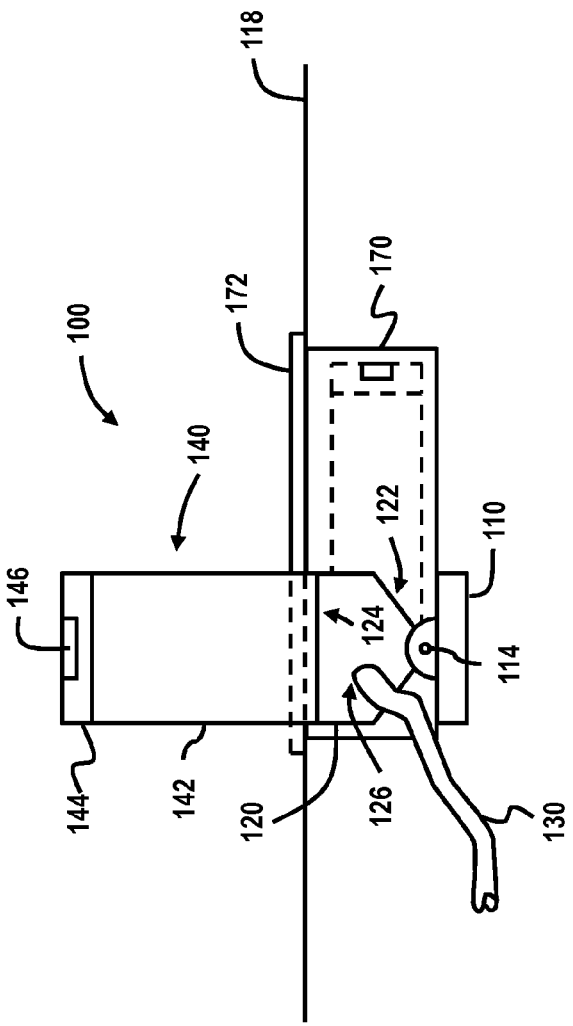
FIG. 1 is a diagram of a termination pedestal, according to one embodiment.

FIG. 1 illustrates a termination pedestal 100 in accordance with at least one embodiment. The termination pedestal 100 includes a base 110, a mount 120, and a cover 140. The base 110 is configured for providing an anchor point for the termination pedestal 100. As such, the base 110 can be positioned a predetermined distance below ground level 118. In order to prevent environmental damage, the base 110 can be constructed from various corrosion resistant materials. For example, the base 110 can be constructed from corrosion resistant metals or metal alloys. Additionally, the metal and/or metal alloys can be treated with specialized paints or sealants which resist corrosion. The base 110 can also be constructed from high strength plastics or other corrosion resistant materials. According to an embodiment, the base 110 can be stabilized by means of attachment to a foundation in order to maintain the termination pedestal 100 in a substantially immovable or stable position. For example, the base 110 can be attached to a cement foundation using appropriate fasteners such as screws, nails, etc. The base 110 can also be attached to the ground using appropriate fasteners.

Figure 2:
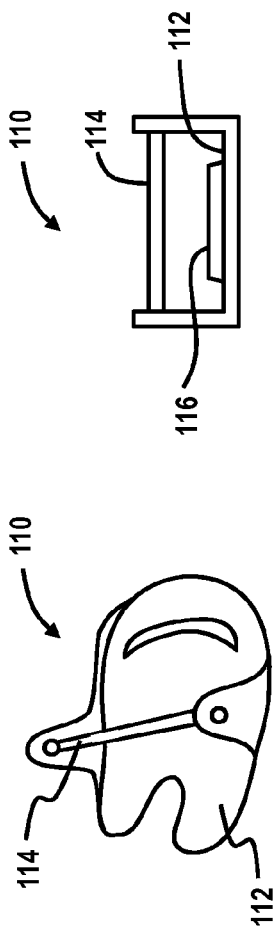
FIG. 2 is a diagram of a base for use with the termination pedestal of FIG. 1, according to one embodiment.

Referring additionally to FIG. 2, the base 110 can include a planar surface 112. It should be noted that the shape illustrated for the base 110 is only exemplary, and various other configurations can be provided. The base 110 further includes an axle 114 which is elevated a predetermined distance from the surface 112. According to at least one embodiment, a portion of the base 110 can extend perpendicular from the surface 112 in order to mount the axle 114. According to another embodiment, the axle 114 can be removably mounted on the base 110. This can allow the mount 120 and corresponding portions of the termination pedestal 100 to be removed, replaced, etc.

A locking mechanism 116 can also be provided on the base 110. According to at least one embodiment, the locking mechanism 116 can be configured to interact with the axle 114 and prevent rotation thereof. As will be discussed in greater detail below, such rotation can, under at least an embodiment, control orientation of the termination pedestal 100. For example, a locking pin can be provided to engage the axle 114 in order to prevent rotational movement. According to other embodiments, however, the locking mechanism 116 can interact directly with the mount 120 in order to restrict movement of the termination pedestal 100.

The mount 120 is configured to be mounted on the axle 114 such that it is capable of pivoting, or rotating, about the axle 114. The mount 120 has a generally hollow interior and includes at least one aperture 126 that can be used to receive one or more cables 130 therein. The cables 130 can be used, for example, to provide a connection between a central service facility and the termination pedestal 100 and/or to provide a connection between the termination pedestal 100 and one or more service subscribers (e.g., household, building, etc.). Additionally, the cables 130 can be used to provide connections between multiple termination pedestals 100.

According to an embodiment, the mount 120 includes a tapered end 122 which allows it to be pivotally coupled to the axle 114. More particularly, the taper formed at the end of the mount 120 functions, at least in part, to define the degree of rotation possible. Furthermore, the distance between the axle 114 and the surface 112 can also assist in defining the degree of rotation. According to an embodiment, the mount 120 can be configured such that it is capable of pivoting at least 90°. Accordingly, such rotational freedom can allow the mount 120 to be oriented in a vertical direction or a horizontal direction. Furthermore, when oriented in the vertical direction, the locking mechanism 116 can be used to stabilize the mount 120, thereby locking the termination pedestal 100 in an upright position.

The mount 120 further includes an open end 124 which is opposite to the tapered end 122. The open end 124 allows various items to be stored, or attached, within the mount 120. According to at least one embodiment, the cables 130 entering the mount 120 through the apertures 126 can contain various combinations of conducting wires, optical fibers, etc. 132. An outer sheath is typically provided to protect the conducting wires and/or optical fibers 132. The outer sheath can be removed to expose the conducting wires and/or optical fibers 132 such that a predetermined length thereof can be stored within the mount 120. For example, five (5) feet of cable length can be drawn into the mount 120 so that the corresponding wires 132 are also five feet in length upon removing the sheath. This can provide flexibility, for example, to remove portions of a wire (or wires) which become damaged. In order to reduce and/or prevent moisture from entering the mount 120, the cable 130 and/or aperture 126 can be sized such that a moisture resistant, or moisture blocking, fit is achieved. Alternatively, a gasket can be provided between the cable 130 and the periphery of the aperture 126 in order to prevent and/or reduce passage of moisture, or other liquids, into the mount 120. The aperture 126, therefore, can be configured in various ways to provide a liquid/moisture tight seal once the cable 130 is in place.

As illustrated in FIG. 1, a cover 140 can provided for attachment to the open end 124 of the mount 120. According to an embodiment, the cover 140 may be attached to the mount 120 by means of corresponding threads on the cover 140 and the mount 120. According to other embodiments, a friction configuration can be used. For example, the mount 120 can include a raised portion on its outer periphery which causes a seal when the cover 140 is placed thereon. The cover 140 can subsequently be released by pulling with a predetermined amount of force. Various other configurations can also be provided for attaching the cover 140 to the mount 120.

According to an embodiment, the cover 140 can be configured to include a body portion 142 and a cap 144. As illustrated in FIG. 1, the body portion 142 can have a generally tubular configuration such that the interior is hollow. The body portion 142 can be attached to the mount 120 at one end in various manners, such as those previously discussed. According to at least one embodiment, the cap 144 can further include a security lock 146 which prevents it from being removed from the body portion 142 by unauthorized personnel. As such, the cap 144 can provide a measure of security from damage to the contents of the termination pedestal 100 by vandals and/or animals. Various configurations can be used for the locking mechanism 116 including conventional keys and/or specialized access tools. According to other embodiments, however, the cap 144 may be configured without the security lock 146. Rather, the cap 144 can be attached to the body portion 142 using conventional threading arrangements or friction arrangements. Additionally, if the cover 140 is configured as a single component, it can also include a security lock 146 in order to prevent tampering.

As previously discussed, various steps can be taken in order to prevent moisture or liquids from entering the mount 120. An increased level of moisture can cause damage and/or corrosion to the conducting wires and/or optical fibers 132 that are stored within the mount 120. Such damage can result in decreased, or complete loss, of signal transmission through the wires and/or optical fibers 132. Thus, according to an embodiment, a compartment 170 can be provided below the ground level 118 in order to provide an isolated environment for storing the termination pedestal 100. As previously discussed, the axle 114 allows the mount 120 to rotate to predetermined orientations. One such orientation corresponds to a horizontal position wherein the base 110 and cover 140 are completely below the ground level 118. Another such orientation corresponds to a vertical position wherein the base 110 and cover 140 are also completely underground.

Thus, in embodiments where a compartment 170 is provided, the mount 120 and cover 140 would be completely within the compartment 170 when placed in the horizontal position. Furthermore, an access panel 172 can be provided to prevent moisture, water, or other liquids from entering the compartment 170. Furthermore, by providing a horizontal orientation for the termination pedestal 100, utility companies can comply with local regulations which prohibit utility structures, such as the termination pedestal 100, from being visible above ground level 118. Although not shown in FIG. 1, a security lock can also be provided on the access panel 172 in order to prevent tampering.

Figure 3:
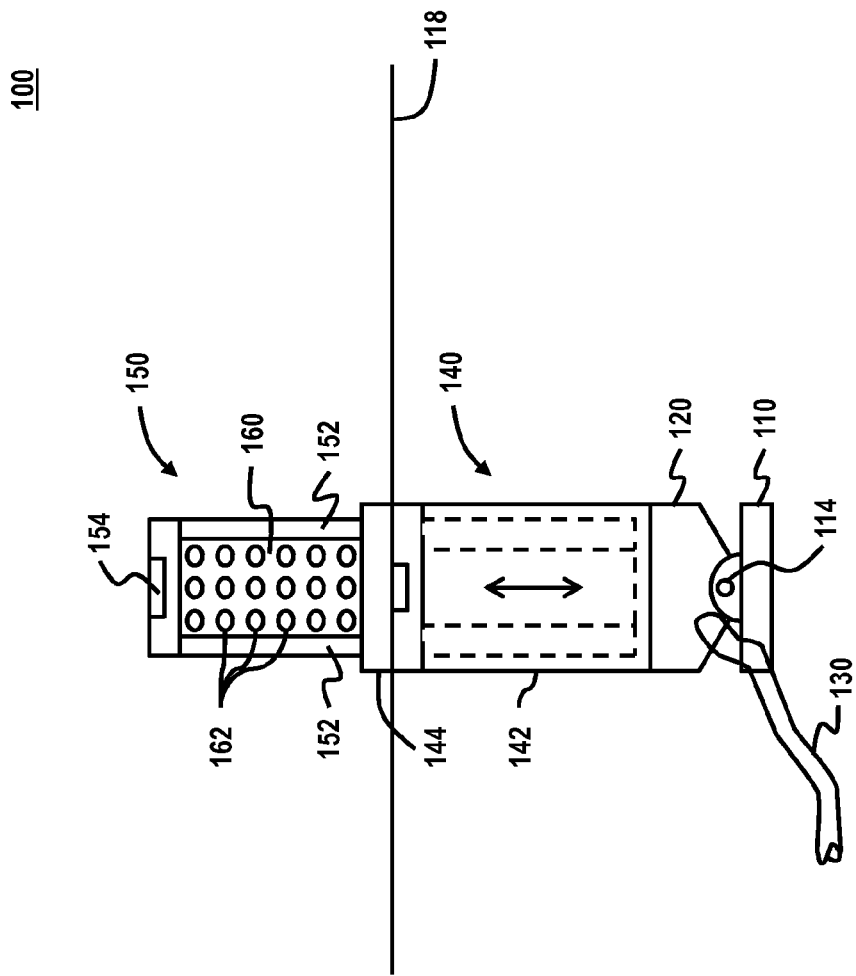
FIG. 3 is a diagram of a termination pedestal mounted in accordance with one embodiment.

Referring to FIG. 3, a track assembly 150 can be provided within the mount 120. The track assembly 150 can include, for example, a plurality of rails 152 that can be used for attaching one or more patch panels 160. According to an embodiment, the track assembly 150 can include an extension lock 154 which allows it to be extended or retracted. For example, as illustrated in FIG. 3, the termination pedestal 100 is oriented vertically and below the ground level 118. The extension lock 154 can be used to release the rails 152 from a predetermined position such that the track assembly 150 can be moved to the extended position. The extension lock 154 could then be engaged to maintain the extended position. The extended position places the patch panel 160 above the ground level 118. In the extended position, the patch panel 160 can be accessed by a service technician. Depending on the specific embodiment, the predetermined positions can vary from a fraction of the length of the track assembly 150, the entire length of the track assembly 150, or any distance within the range of extension.

The patch panel 160 includes a plurality of connectors 162 that facilitate various termination functions. According to one or more embodiments, the connectors 162 can be configured for splicing or termination. The connectors 162 can also be grouped based on the particular configurations. According to such a configuration, the lower three rows of connectors 162 can be used for termination, while the upper three rows of connectors 162 can be used for splicing. For example, the connectors 162 can be used to terminate the conducting wires and/or optical fibers 132 that are routed through the cable 130 and stored in the mount 120. Accordingly, once the patch panel 160 is accessed, the appropriate conducting wire or optical fiber can be retrieved from the mount 120 and terminated or spliced at one of the connectors 162.

According to an embodiment, at least a portion of the track assembly 150 can be removed from the mount 120 and placed on a work surface. The work surface can correspond to various structures, such as a portable workstation, a portable table, etc. Furthermore, the work surface can also correspond to the ground. More particularly, in order to perform the necessary tasks, a service technician can simply remove a portion of the track assembly 150, and place it on the ground. In such situations, a protective material, such as a tarp, can be placed on the ground in order to prevent moisture or debris from contacting the patch panel 160.

Figure 4:
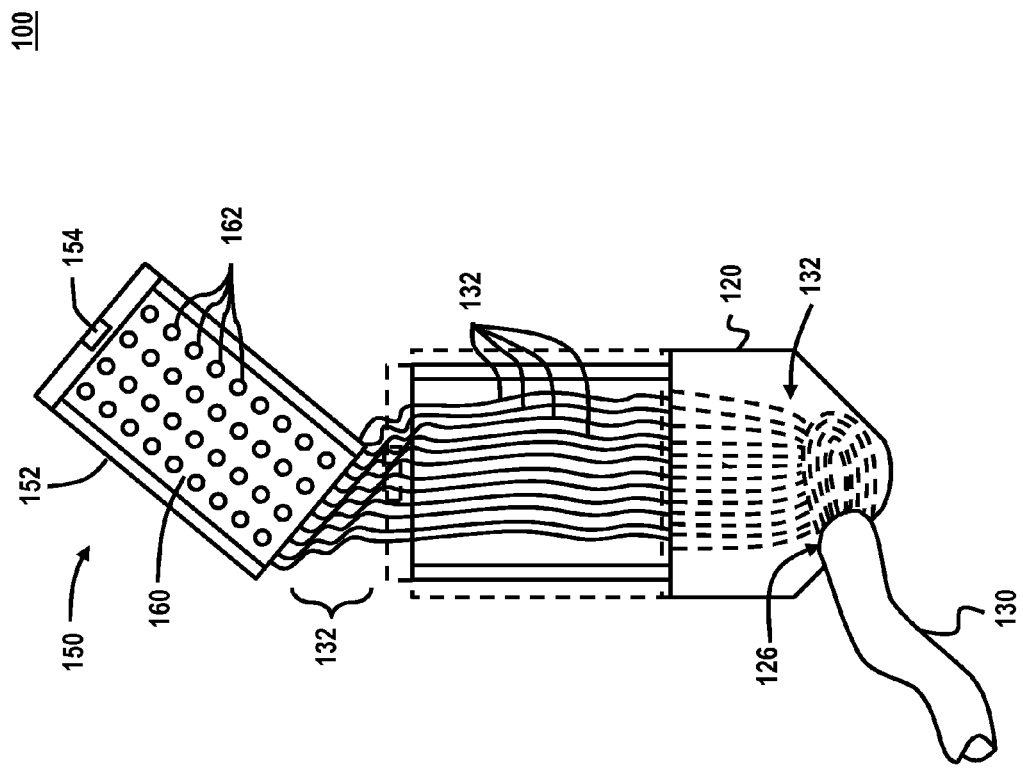
FIG. 4 is a diagram illustrating a patch panel configuration, according to one embodiment.

As illustrated in FIG. 4, the cable 130 enters the mount 120 through the aperture 126, and is stripped in order to access a plurality of wires 132 therein. The amount of the cable 130 which is drawn into the aperture 126 and stripped can vary depending on the size of the mount 120 and/or the distance that the track assembly 150 is configured to travel. For example, if the track assembly 150 is configured such that a portion can be removed and placed on the ground, then an appropriate length of wire would be removed from the cable 130 and stored within the mount 120. This length can correspond to the height and a distance corresponding to a margin of safety. Thus, an extended length could allow for a length corresponding to the distance from the ground level 118 to the height of the termination pedestal 100 plus an additional distance where a service technician can perform necessary tasks.

According to other embodiments, if the size of the mount 120 is insufficient for storing an extended length of wires 132, then the track assembly 150 can be configured to move only to a predetermined extension. As further illustrated in FIG. 4, individual wires 132 are routed to the patch panel 160 and terminated (not shown) at different connectors 162 on the patch panel 160. Thus, various embodiments can allow the technician to arrange and/or place the patch panel 160 at different locations in order to perform operations with the wires 132. Furthermore, the cable 130 can include additional (or backup) wires which do not carry any signals. Such wires can be used to replace wires which become damaged at inaccessible points in the deployment route.

Figure 5A:
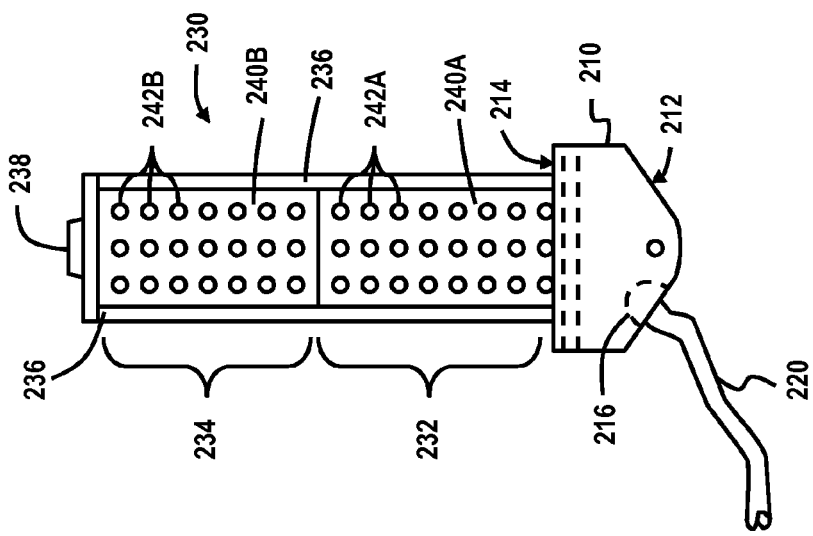
FIG. 5A is a diagram illustrating a patch panel configuration, according to another embodiment.

FIG. 5A illustrates a termination pedestal 200 containing a patch panel 240A, 240B in accordance with an embodiment. The termination pedestal 200 includes a mount 210, a track assembly 230, and a cover 250. The mount 210 includes a tapered end 212 and an open end 214. One or more apertures 216 can be provided so that an external cable 220 (or cables) can be received within the mount 210. As previously discussed, the cable 220 can include a plurality of wires within an outer sheath. Once the cable 220 has been inserted into the aperture 216, the section of the outer sheath within the mount 210 can be removed in order to expose the wires. The length of cable 220 inserted within the mount 210 and stripped of the sheath depends on the specific configuration being used. Furthermore, the amount of wire exposed can also depend on the volume of space available within the mount 210. Various operations can then be performed on the wires, such as termination at one or more connectors 242AB on the patch panel 240A, 240B.

As illustrated in FIG. 5A, the track assembly 230 includes a first tier 232 and a second tier 234. The first tier 232 and the second tier 234 are each configured to accommodate a patch panel 240A, 240B therein. According to one or more embodiments, the first patch panel 240A can be configured for termination, while the second patch panel 240B is configured for splicing. The connectors 242A on the first patch panel 240A would therefore be used for terminating, while the connectors 242B on the second patch panel 240B would be used for splicing. Thus, according to the illustrated embodiment, the termination pedestal 200 is capable of accommodating twice the number of terminations. It should be noted, however, that additional tiers can be provided depending on the specific embodiment and/or application.

According to an embodiment, the first tier 232 and the second tier 234 are formed on a common rail assembly 236. According to other embodiments, the rail assembly 236 can be staggered or otherwise configured for cooperative positioning of the first tier 232 and the second tier 234. The track assembly 230 can also include an extension lock 238 which allows the rail assembly 236 to be extended or retracted to predetermined positions. Depending on the specific embodiment, the predetermined positions can vary from a fraction of the length of the track assembly 230, the entire length of the track assembly 230, or any distance in between. Furthermore, other embodiments allow at least a portion of the track assembly 230 to be removed and placed on a work surface. Additional embodiments further allow the first tier 232 and the second tier 234 to be separated such that only the second tier 234 is removable for placement on the work surface.

Figure 5B:
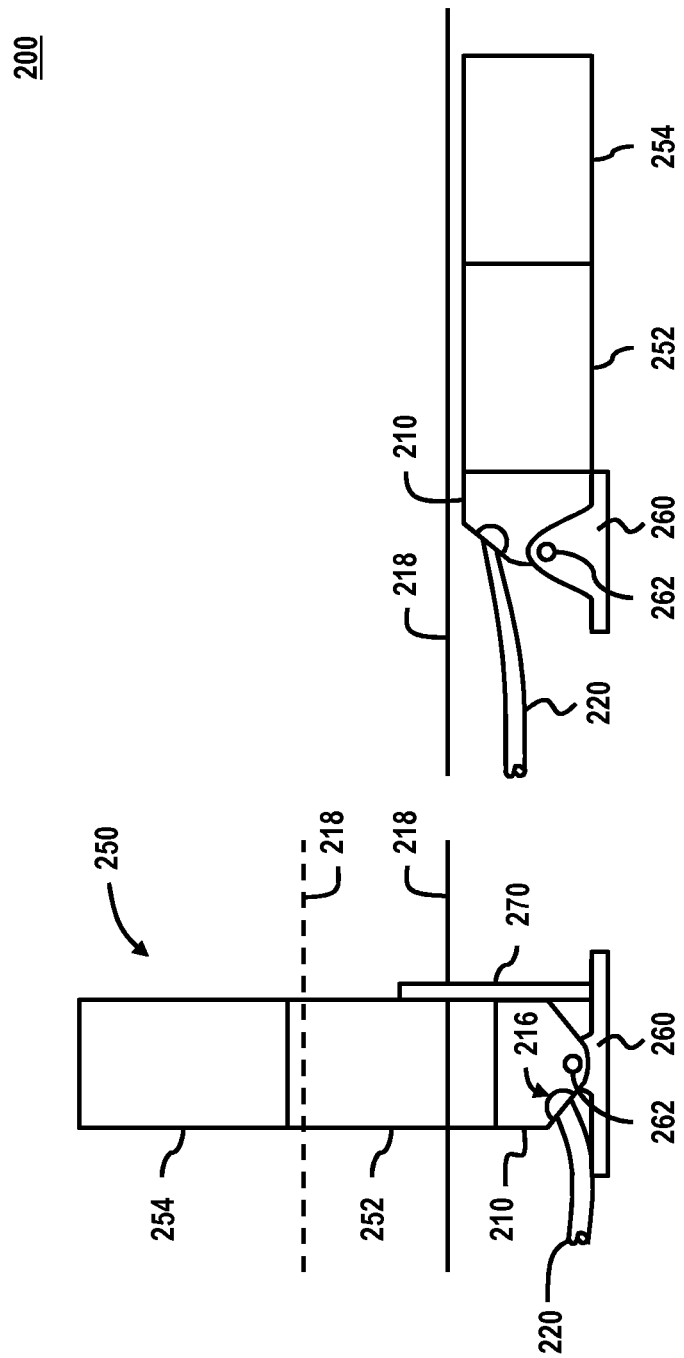
FIG. 5B is a diagram illustrating a termination pedestal for housing the patch panel illustrated in FIG. 5A, according to one embodiment.

FIG. 5B illustrates the termination pedestal 200 in an enclosed configuration for housing the patch panel 240A, 240B illustrated in FIG. 5A. The mount 210 is configured such that it can be pivotally attached to the base 260 by means of an axle 262. Thus, according to at least one embodiment, the termination pedestal 200 can be pivoted about the axle 262 to occupy various orientations. For example, the illustrated embodiment shows the termination pedestal 200 occupying a vertical orientation and a horizontal orientation. It should be noted, however, that the termination pedestal 200 can be configured to occupy any angular displacements between horizontal and vertical.

The termination pedestal 200 also includes a cover 250 which can be detachably secured to the mount 210. This can be achieved by means of threading, friction, snaps, etc. The cover 250 can further be configured with or without a security lock. According to the embodiment illustrated in FIG. 5B, the cover 250 includes an intermediate portion 252 and a top portion 254. The intermediate portion 252 attaches to the mount 210 at one end, and attaches to the top portion 254 at the other end. According to one or more embodiments, various seals, such as gaskets, can be provided at the points where the intermediate portion 252 attaches to the mount 210 and where the top portion 254 attaches to the intermediate portion 252. The seals and/or gaskets provide an additional barrier for preventing moisture and liquids such as water.

According to an embodiment, the termination pedestal 200 can be constructed such that only a portion of the intermediate portion 252 is configured for placement below the ground level 218. The remaining part of the intermediate portion 252 remains above the ground level 218, as does the top portion 254. According to other embodiments, most, or all, of the intermediate portion 252 can be disposed below the ground level 218. Thus, only the top portion 254 would extend above the ground level 218. The portion below ground level 218 can therefore be configured to include sealing arrangements appropriate for isolating the termination pedestal 200 from the surrounding environment.

As illustrated in FIG. 5B, embodiments of the invention which provide for placement of only a short length (i.e., less than half) of the intermediate portion 252 to be located below the ground level 218 can also be configured for orienting the termination pedestal 200 horizontally. Under such orientation, the termination pedestal 200 can be placed entirely beneath the ground level 218. According to at least one embodiment, a stabilizing bar 270 can be provided to assist in maintaining the termination pedestal 200 in the vertical orientation. The stabilizing bar 270 can be configured as a removable component capable of being attached directly to the base 260. Alternatively, the stabilizing bar 270 can be permanently attached to the base 260 and configured for movement to a position which allows the mount 210 to be pivoted to the horizontal position when the termination pedestal 200 will be placed below ground level 218.

Figure 6A:
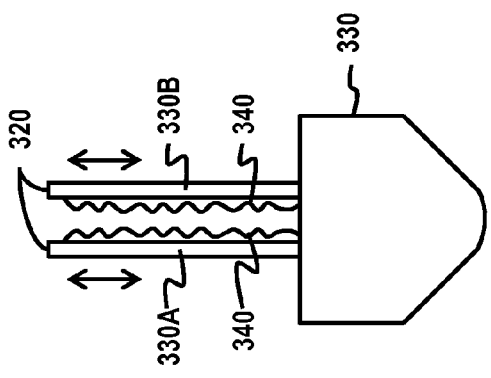
FIG. 6A is a diagram illustrating an arrangement of multiple patch panels, according to one embodiment.
Figure 6B:
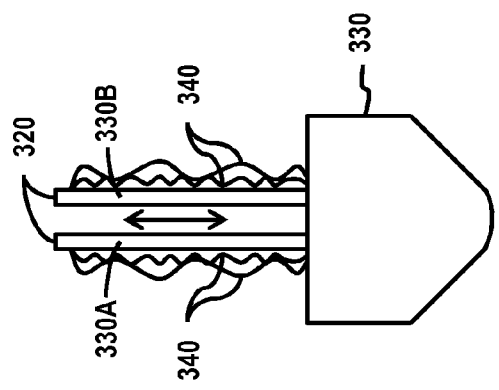
FIG. 6B is a diagram illustrating an arrangement of multiple patch panels, according to another embodiment.

FIGS. 6A and 6B illustrate additional embodiments for configuring multiple patch panels within a termination pedestal. According to one embodiment, the track assembly 320 can be disposed within the mount 300 such that it includes two sets of rail assemblies for receiving a first patch panel 330A and a second patch panel 330B. The first and second patch panels 330A, 330B are oriented such that a back portion of the first patch panel 330A faces a back portion of the second patch panel 330B. Thus, the wires 340 are routed between the two patch panels 330A, 330B. In order to perform termination functions, for example, the track assemblies 320 can be configured for independent extension and retraction, as represented by the arrows. Thus, when terminating wires 340 on the first patch panel 330A, the track assembly 320 on which the first track panel is mounted can be extended in order to provide access to the rear, where the wires 340 will be terminated. Similarly, when working with the second patch panel 330B, the corresponding track assembly 320 would be extended in order to provide access to the rear thereof.

As illustrated in FIG. 6B, another embodiment allows the first patch panel 330A to be mounted such that a front surface thereof faces a front surface of the second patch panel 330B. Accordingly, the wires 340 are visible upon removal of the cover. Such a configuration can allow a service technician to perform various operations without the need to expand and/or retract any part of the track assembly 320. According to further embodiments, the track assembly 320 can still be extended in order to position the first patch panel 330A and/or the second patch panel 330B at different heights. Furthermore, the track assembly 320 can be configured such that the first and second patch panels 330A, 330B can be removed and placed on a work surface.

Figure 7:
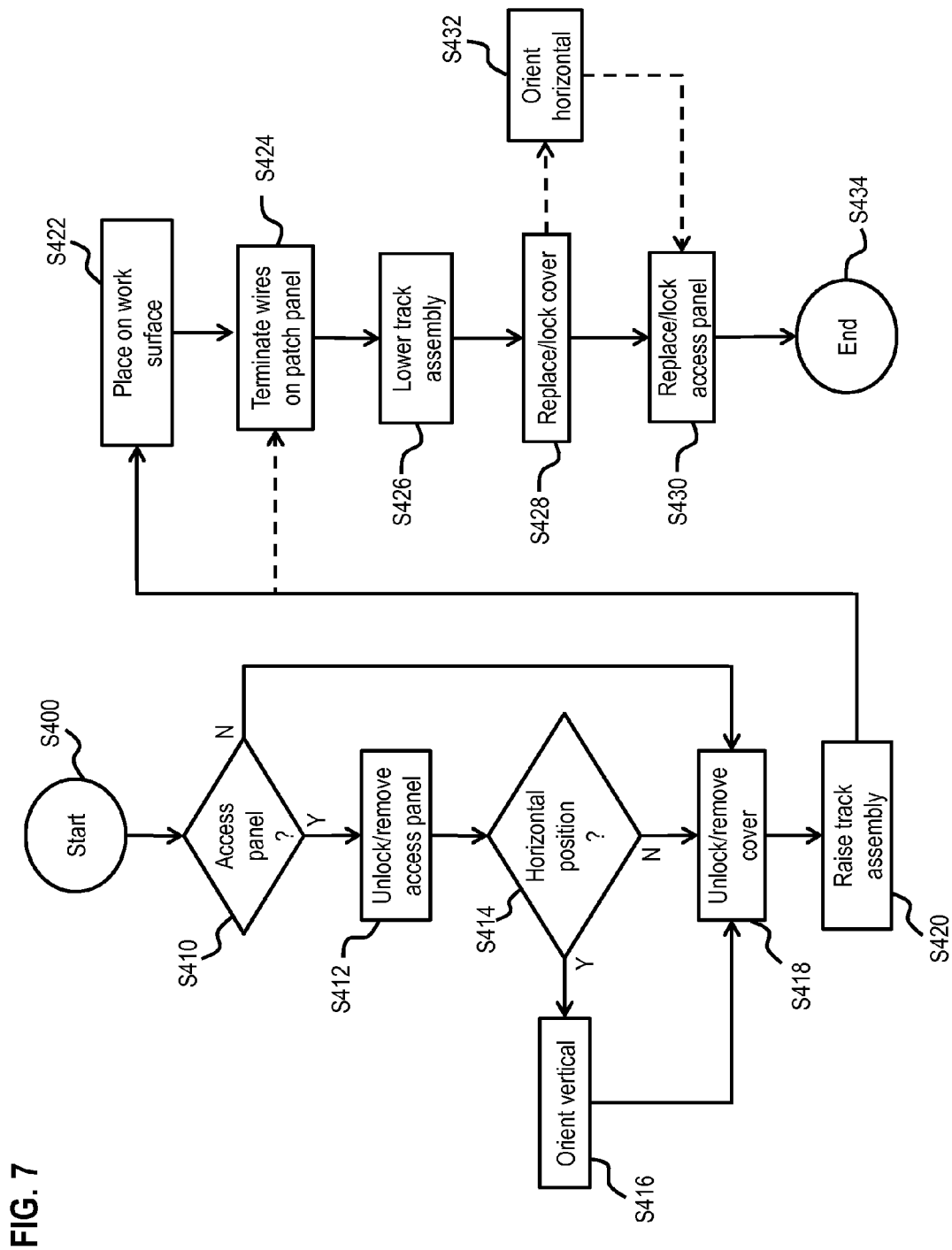
FIG. 7 is a flowchart of a process for performing operations on a termination pedestal, according to one embodiment.

FIG. 7 is a flowchart illustrating the steps performed to terminate wires using a termination pedestal in accordance with at least one embodiment. The process begins at S400. At S410, it is determined whether an access panel is provided over the termination pedestal. As previously discussed, the access panel can be used in conjunction with a compartment, in part, to isolate the termination pedestal from the environment when it is positioned below ground level. If an access panel is provided, then control passes to S412, where the access panel is unlocked and removed so that a technician can gain access to the components housed within the termination pedestal. In embodiments where no lock is provided, the access panel would simply be removed at S412. If no access panel is provided, then control passes to S418. For example, according to at least one embodiment, the termination pedestal may be positioned above ground in a vertical orientation, which only requires removal of the cover.

At S414, it is determined whether the termination pedestal is oriented in a horizontal position. If the termination pedestal is not oriented horizontally, then control passes to S418. This can correspond, for example, to embodiments where the termination pedestal is positioned below ground level, but in a vertical orientation. If the termination pedestal is positioned horizontally and below ground level, then control passes to S416. At this point, the termination pedestal would be oriented vertically. This can be accomplished, for example, by lifting one end of the termination pedestal and pivoting it about the axle on which the base is mounted. Control can then optionally pass to S418, where the cover is unlocked. If no lock was provided on the cover, however, the access panel would simply be removed at step S418.

At S420, the track assembly is raised in order to provide access to the patch panel. According to at least one embodiment, at least a portion of the track assembly can be removed and placed on a work surface at S422. As previously discussed, the work surface can be in the form of a portable work stand, the ground, etc. According to other embodiments, the track assembly can remain in the raised position and control would pass directly to S424 without having to remove the track assembly. At S424, the service technician would perform all the steps necessary for operations such as, for example, terminating and/or splicing the wires on the patch panel. Once the operations are complete, the track assembly can be lowered (i.e., retracted) to its original position. The cover can then be replaced and locked at S428 in order to prevent unauthorized access. Furthermore, if the termination pedestal was oriented horizontally below ground level, then it would be returned to the horizontal position at S430. Alternatively, if the termination pedestal was oriented vertically below ground level, then control would pass to S432 upon replacing and locking the cover. At S432, the access panel can be replaced and locked. The process then ends at S434.

In the preceding Specification, various preferred embodiments have been described with reference to the accompanying drawings. It will, however, be evident that various modifications and changes may be made thereto, and additional embodiments may be implemented, without departing from the broader scope of the invention as set forth in the claims that follow. The Specification and drawings are accordingly to be regarded in an illustrative rather than restrictive sense.

What is claimed is:

1. An apparatus comprising:
    a base having a planar surface;
    an axle mounted on the base and elevated from the surface;
    a mount having a hollow interior, and including a tapered end pivotally coupled to the axle and an open end, the mount further including an aperture for receiving a cable;
    a track assembly attached to the mount and extending through the open end;
    at least one patch panel mounted on the track assembly; and
    a cover detachably secured to the mount for enclosing the track assembly and the at least one patch panel therein.

2. An apparatus of claim 1, further comprising an axle lock for locking the axle at predetermined positions and orienting the mount in one or more directions.

3. An apparatus of claim 2, wherein the one or more directions include at least a vertical direction and a horizontal direction.

4. An apparatus of claim 1, wherein the track assembly is extendable to one or more positions, and further comprising an extension lock for releasably securing the track assembly in the one or more positions.

5. An apparatus of claim 1, further comprising:
    an intermediate portion interposed between the cover and the mount, the intermediate portion having a tubular configuration,
    wherein the intermediate portion includes a first end detachably secured to the mount and a second end detachably secured to the cover.

6. An apparatus of claim 1, wherein the cover comprises:
    a body portion having a tubular configuration and a first end detachably secured to the mount; and
    a cap detachably secured to a second end of the body portion.

7. An apparatus of claim 6, wherein the cap includes a locking mechanism.

8. An apparatus of claim 6, wherein the base and body portion are disposed below ground level.

9. An apparatus of claim 1, wherein a least a portion of the cover is disposed below ground level.

10. An apparatus of claim 1, wherein the at least one patch panel is configured for terminating a plurality of conducting wires, optical fibers, or a combination thereof.

11. An apparatus of claim 1, wherein at least a portion of the track assembly is removable.

12. An apparatus of claim 1, wherein:
the track assembly includes a staggered configuration;
the at least one patch panel comprises at least one pair of patch panels; and
patch panels from each pair of patch panels are arranged facing each other, facing away from each other, or a combination thereof.

\* \* \* \* \*